No. 773,823. PATENTED NOV. 1, 1904.
A. L. STREETER.
BRAKE SHOE.
APPLICATION FILED MAR. 23, 1903.
NO MODEL. 2 SHEETS—SHEET 1.

Witness:
F. M. H. Clay
Chas. H. Ebert

Inventor,
Alfred L. Streeter
By Paul Synnestvedt
Atty.

No. 773,823. PATENTED NOV. 1, 1904.
A. L. STREETER.
BRAKE SHOE.
APPLICATION FILED MAR. 23, 1903.
NO MODEL. 2 SHEETS—SHEET 2.
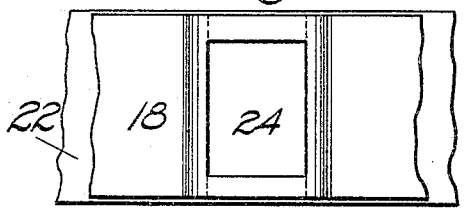
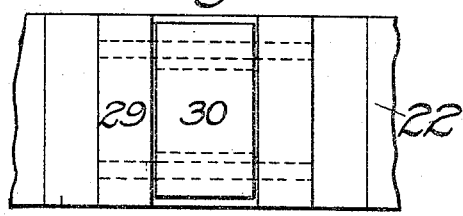
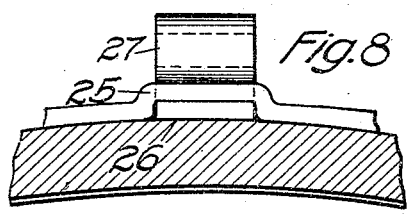
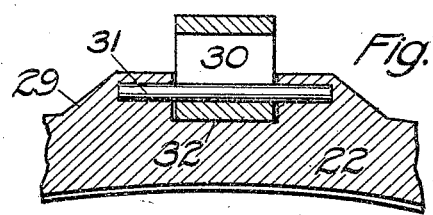
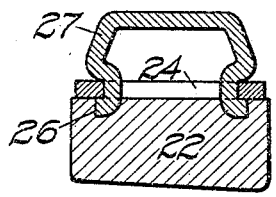
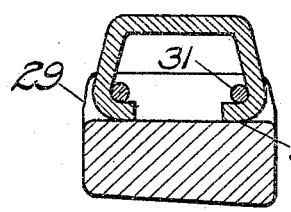
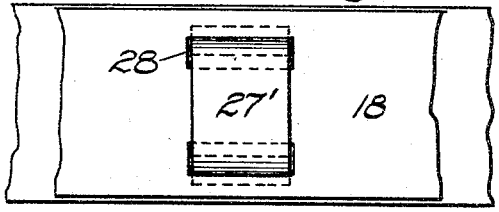
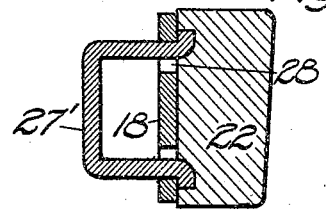
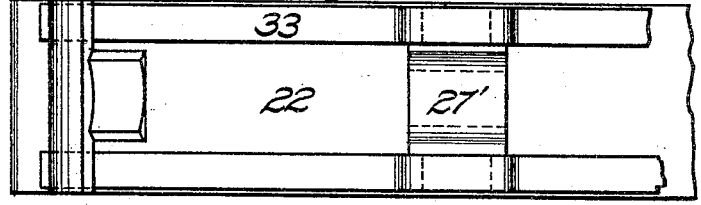
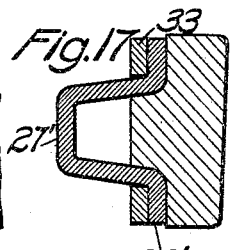
Witness:
J. W. H. Clay
Chas. H. Ebert
Inventor,
Alfred L. Streeter
By Paul Synnestvedt
Atty.

No. 773,823.  
Patented November 1, 1904.

UNITED STATES PATENT OFFICE.

ALFRED L. STREETER, OF CHICAGO, ILLINOIS, ASSIGNOR TO AMERICAN BRAKE SHOE & FOUNDRY COMPANY, OF NEW YORK, N. Y., A CORPORATION OF NEW JERSEY.

BRAKE-SHOE.

SPECIFICATION forming part of Letters Patent No. 773,823, dated November 1, 1904.

Application filed March 23, 1903. Serial No. 149,142. (No model.)

*To all whom it may concern:*

Be it known that I, ALFRED L. STREETER, a citizen of the United States, residing at Chicago, in the State of Illinois, have invented certain new and useful Improvements in Brake-Shoes, of which the following is a specification.

My invention relates to the wearing blocks or shoes used upon railway brakes and more particularly to the strengthening backs thereof and means for attaching the same to the brake head. The objects of my invention are, to provide a superior attaching lug of malleable metal; to provide convenient means for fixing the lug upon a steel-backed or reinforced shoe; to provide for the attachment of a separate malleable metal key lug on a steel backing without the casting in the body of the shoe; to provide improved means for anchoring a malleable metal shoe lug under the elements of the steel backing of a brake shoe, and to generally improve and strengthen the means for attaching a brake shoe in its place in the brake head.

These objects, and other advantages which will hereinafter appear, I attain by means of the construction and arrangement of parts as illustrated in several forms in the accompanying drawings, wherein—

Figures 7, 8 and 9 show a form in which the steel back is cut open at the center and upwardly off-set to receive the lug.

Figures 10 and 11 show a similar arrangement with the exception that there are two slots in the back instead of a single opening.

Figures 12, 13 and 14 show respectively a plan, a longitudinal and a cross section of a modified arrangement by which the malleable strap forming the key lug may be attached to a cast shoe without a steel backing.

Figures 15, 16 and 17 show respectively a plan, a longitudinal and a cross section of a modified form of steel backing which I prefer, together with the key lug attached thereto.

Owing to the danger of accidents caused by the breaking and falling apart of cast iron brake shoes, such shoes have frequently been provided with a reinforced back formed of some kind of frame work of malleable metal, or a single steel plate. There are many advantages also in the use of a malleable attaching lug. But it is very difficult, as well as expensive, to make the key lug or eye of proper form integral with the backing. Where flat steel straps have been used to strengthen the key lug, they have generally been partly or entirely buried in cast metal surrounding the same.

It will be seen that I have provided various modes of attachment of a separate eye strap to form the key lug, used in conjunction with a steel back or other longitudinally disposed malleable strips for strengthening the cast iron.

Figure 1:
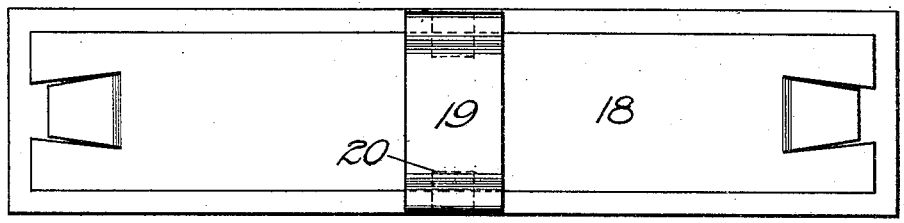
Figure 1 is a plan view of a steel back with a malleable key lug attached thereto, the body of the shoe being shown in outline.
Figure 2:
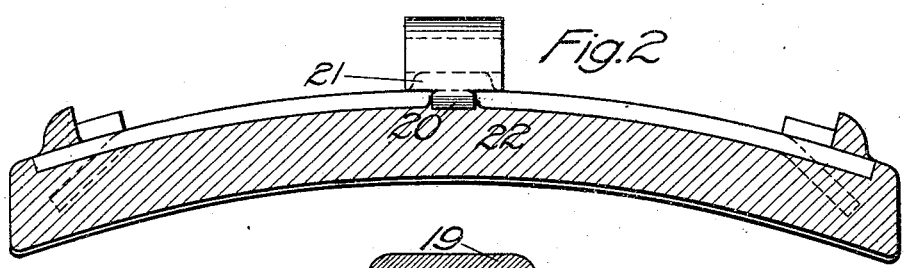
Figures 2 and 3 are respectively longitudinal and cross sections of such a shoe and backing.
Figure 3:
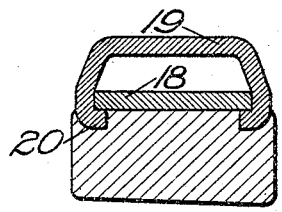

I generally prefer, as illustrated in Fig. 1, to form the steel back with an up-set or upwardly recessed hump at the middle, 21, and form the key lug of a flat piece of steel 19, formed with inwardly turned projecting legs 20, which is sprung over the back 18, and fits in the recessed portion 21, whereupon the cast metal of the shoe is poured in and surrounds the parts 20 on the sides. The hump 21, in the back, avoids any weakening of the body of the shoe by forming a recess for the legs 20.

Figure 4:
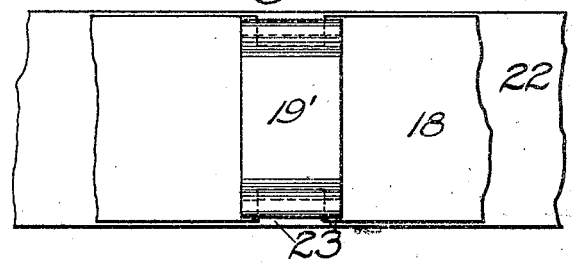
Figures 4, 5 and 6 are views showing respectively the plan, side elevation and cross-section of another form of lug as attached to a steel back essentially the same width as the shoe, resting flat thereon and notched to receive the legs of the lug strap.
Figure 5:
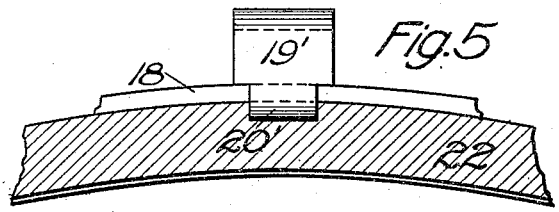
Figure 6:
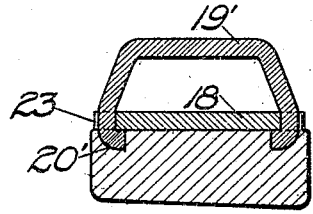

This construction may be modified as in Figures 4, 5 and 6, by forming notches 23, in the steel back 18, for the reception of the legs of the strap 19'.

For additional safety the back may be formed as in Figures 7, 8 and 9, with an open space 24, and the strap 27, may be placed in this with outwardly turned legs 26, anchored under the back 18. This form may be made with the off-set portion 25, as before, when desired. As a slight modification of this form of attachment, I may use, as shown in Figures 10 and 11, the two longitudinal slots 28, in the back, instead of the open space 24, the outwardly turned legs 26' of the strap 27' being anchored under the back in this case also.

Figures 12, 13 and 14 illustrate a convenient mode of attaching the malleable metal strap 30, forming the eye lug, to a cast shoe by means of the rods or wires 31. These latter may be either extended throughout the length of the shoe, or may be made short and be buried in the two truncated lugs 29, which form the seat of the brake key. This is a valuable construction even in the cast shoe, since it avoids the necessity of using a core in casting, and makes a perfectly secure anchorage for the key lug.

The form of backing and attachment for the key lug which I at present prefer is shown in Figures 15, 16 and 17. I use for a backing two longitudinal flat strips of steel 33, extending over the whole back of the shoe 22, and anchored at the ends and embedded flush with the back of the shoe. The plates 33 may be off-set at 34, and the strap 27, is provided with outwardly extending legs 26', taking under the off-sets 34 and thus anchored in the cast metal, as will be clear from said figures.

In the various forms of the steel strap lug which I have shown above, the strap may be sprung into place on the backing, and is retained from sidewise displacement by reason of the off-set in the back or by being buried in the metal of the body of the shoe. It forms a somewhat resilient attaching lug for the brake key, avoids the danger of the breaking of the attaching lug, and enables the shoe to be cast without using a core to form the key way, as is customary. Particularly in the forms of Figures 11 and 17, it will be seen that the strap is held perfectly safe in its place and is as securely attached to the reinforced back of the shoe as if it were made integral therewith.

Many other advantages of the construction will readily occur to those familiar with the use of brake shoes.

Having thus described my invention and illustrated several forms in which it may be used, what I claim, and desire to secure by Letters Patent, is the following:

1. A brake shoe provided with a reinforced back and a key lug formed of a separate strap bent into an eye and having outward bent hooked ends anchored under said reinforced backing.

2. In brake shoes the combination of a malleable back, having its ends anchored and an upward bent recess at the middle and a key lug formed of a bent steel strap having its ends anchored under said recessed back of the shoe.

3. In a brake shoe the combination of a steel back having an upwardly off-set recess formed at the center thereof, and a bent steel strap for a key lug having its ends anchored under said back.

4. The combination with a steel back for brake shoes having lateral recesses at the center, of a flat strap forming a key lug bent to embrace said back and having its ends anchored thereunder.

5. A brake shoe provided with two longitudinal malleable metal bars partially embedded in the back thereof and upwardly off-set at the center, combined with a flat steel strap bent to form an eye for a key lug and having its ends buried under said longitudinal bars, substantially as described.

In testimony whereof I have hereunto signed my name in the presence of the two subscribed witnesses.

ALFRED L. STREETER.

Witnesses:
J. D. GALLAGHER,
WILLIAM CONOVER.